May 26, 1970        C. A. ERDMAN        3,514,783
RECORDER HAVING STYLUS WITH RADIUSED AND SLOTTED TIP
Filed Nov. 26, 1968
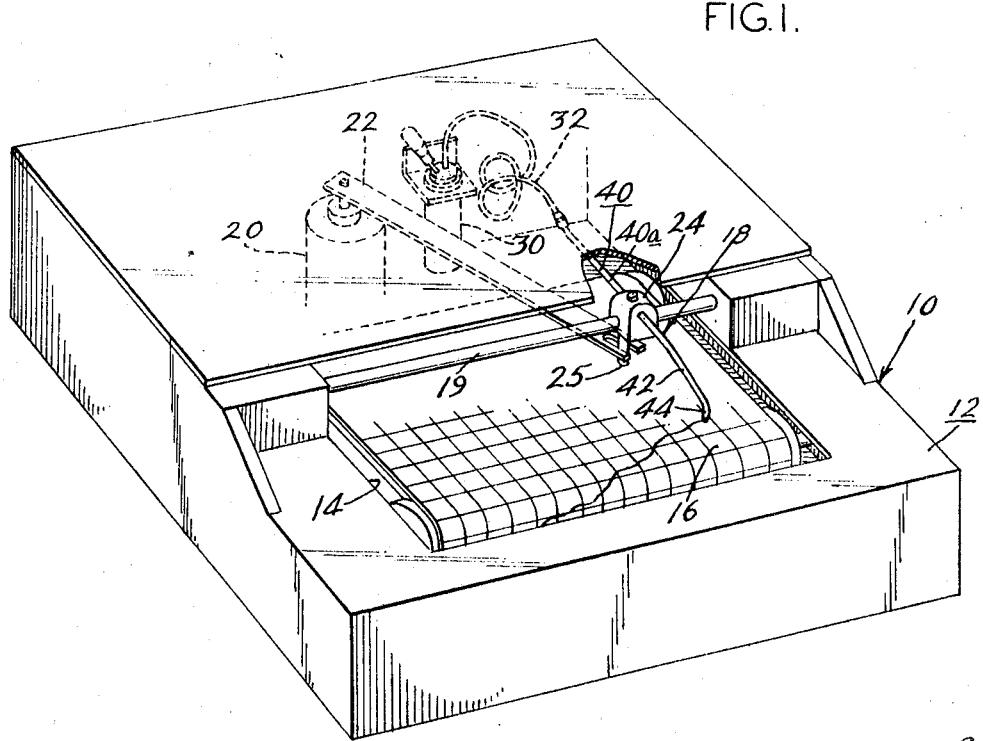
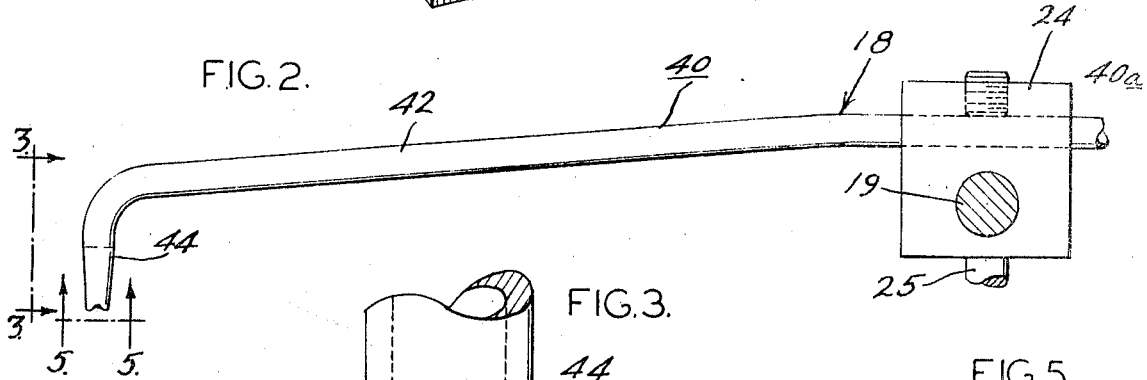
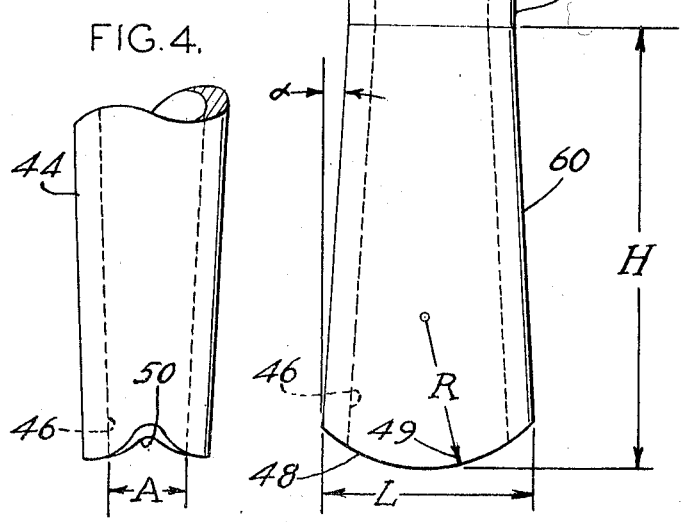
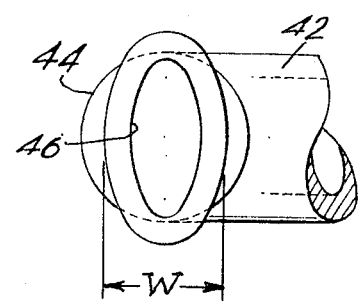
INVENTOR:
CHARLES A. ERDMAN
BY
Howson & Howson
ATTYS.

United States Patent Office 3,514,783
Patented May 26, 1970

3,514,783
RECORDER HAVING STYLUS WITH
RADIUSED AND SLOTTED TIP
Charles A. Erdman, Marlton, N.J., assignor, by mesne assignments, to Graphic Controls Corporation, Buffalo, N.Y., a corporation of New York
Filed Nov. 26, 1968, Ser. No. 778,935
Int. Cl. G01d 15/16
U.S. Cl. 346—140                    1 Claim

ABSTRACT OF THE DISCLOSURE

In a recording device including a housing, a movable recording medium, a stylus assembly having a writing tip at one end and connected to a suitable source of marking fluid to deliver fluid to the writing tip and means for actuating the stylus assembly in response to changes in a variable condition to record a trace on the recording medium, said stylus assembly including an elongated stylus arm having an opening therein of circular cross section and of capillary dimension, one end of the arm defining the writing tip portion disposed substantially perpendicularly to a plane through the main portion of the arm, the front profile of the tip being slightly radiused and the sides of the tip being cut back to define upwardly projecting arcuate slots.

---

The present invention relates to improvements in stylus assemblies, for example of the type employed in recording instruments to record on a chart a trace of a variable condition such as pressure or temperature.

These recording instruments, of which the instrument illustrated in FIG. 1 is typical, generally comprise a housing, a chart, for example a strip chart, mounted for movement in the housing and a stylus assembly supplied with ink from a suitable ink supply, and having a writing tip which normally engages the paper to record a trace thereon in response to a variable condition sensed by a sensor element which is operatively connected to the stylus assembly.

There are certain disadvantages in conventional stylus tips which are typically made of metal and simply ground to a point. These tips, which are comparatively small in size, have a tendency to hang up or catch on the paper and generally have a tendency to skip as they travel across the paper. Furthermore, it has been observed that with sudden and wide fluctuations in direction of movement of the stylus tip, there is a tendency to fling the ink which is, of course, objectionable.

An object of the present invention is to provide a stylus tip characterized by novel features of construction which assures production of a continuous line, does not skip as it travels across the paper, and will not fling ink as it changes direction at the end of a stroke. Additionally, it has been observed that with the tip configuration of the present invention the stylus does not dig into or scratch the surface of the paper.

These and other objects of the present invention and various features and details of the operation and construction thereof are hereinafter more fully set forth with reference to the accompanying drawing wherein;

FIG. 1 is a perspective view of a recording instrument incorporating a stylus assembly in accordance with the present invention;

FIG. 2 is a side elevational view of the stylus arm;

FIG. 3 is a view of the tip as viewed from lines 3—3 of FIG. 2;

FIG. 4 is a fragmentary side elevation of the stylus tip; and

FIG. 5 is a view looking into the tip taken on lines 5—5 of FIG. 2.

Referring now to the drawing and particularly to FIG. 1 thereof, there is illustrated a diagrammatic form of recording instrument generally designated by the numeral 10 incorporating a stylus assembly 18 in accordance with the present invention. Even though the stylus is illustrated in connection with a horizontal type recorder, it is readily apparent that it has uses in other applications and other types of recording instruments such as vertical chart recorders or those employing a disc-type recording medium.

The recording device 10 includes a generally enclosed housing 12 having a window opening 14 therein to expose the strip chart 16 which is suitably mounted on rollers to be driven for movement relative to the recording stylus assembly 18. The stylus assembly 18 is suitably mounted for movement along a bar 19 extending transversely of the strip chart 16 in response to changes in a variable condition sensed by a sensing member 20 through a linkage 22. The stylus assembly 18 as illustrated is supported in a carriage 24 adapted for movement along the rod 19. The carriage has a depending finger 25 which engages the bifurcated outer terminal end portion of the link 22. Thus, in operation as the strip chart is moved relative to the stylus, chnages in a variable condition sensed by the sensing element 20 effect through the linkage 22 movement of the stylus assembly relative to the chart to record a trace thereon. Suitable ink supply means including a cartridge 30 mounted in the housing and a flexible tube 32 connecting the cartridge to the inner end of the stylus assembly is provided to supply ink by siphonic action. It is, of course, to be understood that the details of the recorder described above are generally conventional and that the particular arrangement described and shown is merely for the purpose of illustration and that various other conventional strip chart recording structures may be employed with the stylus assembly of the present invention.

In accordance with the present invention, the stylus arm 40 consists of a main portion 40a, a slightly offset outer terminal portion 42 which extends downwardly relative to the portion of the arm supported in the carriage at an angle of approximately 5 degrees and a tip portion 44 extending substantially perpendicularly to the plane through the main portion of the stylus arm 40. The opening through the main portion of the stylus arm is of generally circular cross section and of capillary dimension whereas the discharge opening 46 in the tip portion is oval shaped and outwardly divergent, that is, of a progressively widening dimension as it approaches the outer terminal edge of the tip in engagement with the paper. The front profile of the outer terminal edge 48 is slightly radiused as at 49 as illustrated in FIG. 3 and the sides of the tip are cut back to define upwardly projecting arcuate slots 50 as best illustrated in FIG. 4. Preferably, the maximum lateral dimension L of the crown or radiused edge 48 of the tip should have a proportion of about 1 to 3 over the width W of the tip.

In addition to the configuration described above, it has been found that other dimensional relationships of the writing tip are important to provide the desired writing action described above. For example, the outwardly divergent portion 60 of the writing tip preferably tapers at an angle $\alpha$ of about 2° and the height H of the outwardly divergent portion is preferably about 0.080 inch. Additionally, the radius R of the crown is preferably 0.025 inch and the maximum lateral dimension L is preferably about 0.033 inch. By this construction as shown in FIG. 4, the opening in side profile in the writing tip converges downwardly and is preferably in the order of about 0.008 inch at A, the terminal end of the writing tip. Further, as illustrated in FIG. 5, the lateral dimension B of the opening at the writing tip is preferably between 0.018 inch and 0.020 inch. Additionally, the dimension W in FIG. 5 is preferably about 0.021 inch.

While a particular embodiment of the present invention has been illustrated and described herein it is not intended to limit the invention and changes and modifications may be made therein within the scope of the following claims.

I claim:
1. In a recording device including a housing, a movable recording medium, a stylus assembly having a writing tip at one end and connected to a suitable source of marking fluid to deliver fluid to the writing tip and means for actuating the stylus assembly in response to changes in a variable condition to record a trace on the recording medium, said stylus assembly including an elongated stylus arm having an opening therein of the arm defining the writing tip portion disposed substantially perpendicularly to a plane through the main portion of the arm,
   the improvement wherein, the front profile of the tip is slightly radiused and the sides of the tip are cut back to define upwardly projecting arcuate slots, and
   wherein R, the radius of the writing tip is preferably about 0.025 inch, L, the maximum lateral dimension of the writing tip is preferably about 0.033 inch, A, the narrowest opening at the writing tip is preferably about 0.008 inch and B, the widthwise dimension of the opening at the writing tip is preferably between 0.018 inch and 0.020 inch.

References Cited

UNITED STATES PATENTS

| | | | |
|---|---|---|---|
| 1,463,004 | 7/1923 | Bowman | 346—140 |
| 2,646,336 | 7/1953 | Edinburg | 346—140 |
| 3,434,159 | 3/1969 | Erdman | 346—139 |
| 3,438,059 | 4/1969 | Highley | 346—140 |

JOSEPH W. HARTARY, Primary Examiner